United States Patent
Jain et al.

(10) Patent No.: US 11,079,843 B2
(45) Date of Patent: Aug. 3, 2021

(54) EYE TRACKING APPARATUSES CONFIGURED FOR DEGRADING IRIS AUTHENTICATION

(71) Applicant: University of Florida Research Foundation, Incorporated, Gainesville, FL (US)

(72) Inventors: Eakta Jain, Gainesville, FL (US); Sanjeev Jagannatha Koppal, Gainesville, FL (US); Brendan Matthew John, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 0 days.

(21) Appl. No.: 16/911,113

(22) Filed: Jun. 24, 2020

(65) Prior Publication Data
US 2020/0401220 A1    Dec. 24, 2020

Related U.S. Application Data

(60) Provisional application No. 62/865,660, filed on Jun. 24, 2019.

(51) Int. Cl.
*G06F 3/01* (2006.01)
*H04N 5/33* (2006.01)
*G02B 27/01* (2006.01)

(52) U.S. Cl.
CPC .............. *G06F 3/013* (2013.01); *H04N 5/33* (2013.01); *G02B 2027/0138* (2013.01); *G02B 2027/0178* (2013.01); *G02B 2027/0187* (2013.01)

(58) Field of Classification Search
CPC .... G02B 2027/0138; G02B 2027/0147; G02B 2027/0178; G02B 2027/0187;
(Continued)

(56) References Cited

U.S. PATENT DOCUMENTS

| 10,762,809 | B1* | 9/2020 | DeLorean | G08G 1/052 |
| 2003/0152251 | A1* | 8/2003 | Ike | G06K 9/00604 |
| | | | | 382/117 |

(Continued)

OTHER PUBLICATIONS

Steil, J., Hagestedt, I., Huang, M. X., & Bulling, A. (Jun. 2019). Privacy-aware eye tracking using differential privacy. In Proceedings of the 11th ACM Symposium on Eye Tracking Research & Applications (pp. 1-9). (Year: 2019).*

(Continued)

*Primary Examiner* — Dmitriy Bolotin
(74) *Attorney, Agent, or Firm* — Alton & Bird LLP (57) ABSTRACT

Provided are methods, apparatuses, and systems for tracking a pupil of an eye of a user with degraded iris authentication accuracy. In certain examples, an eye tracking device includes a camera adapted to capture an eye image of at least one eye of a user. The eye tracking device further includes an image processor adapted to defocus the eye image in order to generate a defocused eye image. The defocused eye image comprises reduced iris authentication accuracy. The eye tracking device further includes a tracking processor configured to detect a pupil in the defocused eye image and determine a gaze direction of the user based at least in part on one or more of the defocused eye image and the pupil.

20 Claims, 10 Drawing Sheets

(58) Field of Classification Search
CPC ............ G02B 27/0068; G02B 27/0093; G02B 27/0172; G06F 3/013; H04N 5/33
See application file for complete search history.

(56) References Cited

U.S. PATENT DOCUMENTS

| | | | | |
|---|---|---|---|---|
| 2016/0007849 A1* | 1/2016 | Krueger | ................ | A61B 5/398 600/301 |
| 2016/0019420 A1* | 1/2016 | Feng | ................ | G06K 9/00906 382/117 |
| 2016/0019421 A1* | 1/2016 | Feng | ................ | G06K 9/00617 382/117 |
| 2018/0012070 A1* | 1/2018 | Shin | ................ | G06K 9/00892 |
| 2019/0278987 A1* | 9/2019 | Eskilsson | ................ | G06F 3/013 |
| 2020/0336637 A1* | 10/2020 | Koppal | ................ | G03B 39/00 |

OTHER PUBLICATIONS

Anonymous. *EyeVEIL: Degrading Iris Authentication in Eye Tracking Headsets*. In Proceedings of ACM ETRA (ETRA 2019). Jun. 25, 2019, pp. 1-5. ACM, New York, NY, USA. https://doi.org.10.475/123_4.

John, Brendan et al. *Let It Snow: Adding Pixel Noise to Protect The User's Identity*. In ACM Symposium on Eye Tracking Research and Applications, Jun. 2, 2020, pp. pp. 1-3.

* cited by examiner

Figure 10B

EYE TRACKING APPARATUSES CONFIGURED FOR DEGRADING IRIS AUTHENTICATION

CROSS REFERENCE TO RELATED APPLICATIONS

This application claims priority to U.S. Provisional Patent Application Ser. No. 62/865,660, titled "EYE TRACKING APPARATUSES CONFIGURED FOR DEGRADING IRIS AUTHENTICATION," filed Jun. 24, 2019, the contents of which are incorporated herein by reference in their entirety.

GOVERNMENT SUPPORT

This invention was made with government support under 1566481 awarded by the National Science Foundation. The government has certain rights in the invention.

TECHNICAL FIELD

The present application generally relates to eye tracking methods and apparatuses. In particular, various embodiments of the invention described herein relate to methods and apparatuses for degrading iris authentication in eye tracking devices while still permitting gaze tracking.

BACKGROUND

Eye tracking technologies are now being incorporated into an increasing array of products, including a variety of head-mounted eye tracking devices (e.g., mixed reality headsets). Many existing eye tracking devices depend on robust detection of a user's pupil to enable gaze tracking. In particular, existing eye tracking devices are provided with cameras that image the user's eye to infer gaze location and pupil diameter. These devices therefore rely on capturing high resolution images of the user's iris to enable their eye tracking functionality.

Figure 1:
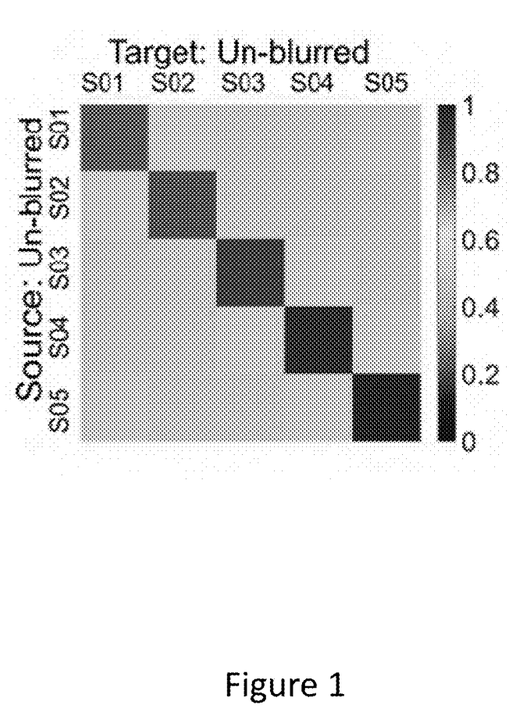
FIG. 1 depicts test results showing the iris recognition capability of an existing eye tracking device known in the art.

The high resolution images captured by existing eye tracking devices present a serious security concern as the images include an iris texture sufficient for iris authentication. This is a highly common biometric signature relied on for a variety of applications, including banking and voting. As an example, FIG. 1 depicts iris recognition matches of eye image samples (S01-S05) captured by an existing eye tracking device (each dark box representing a valid iris authentication). Indeed, FIG. 1 shows a perfect iris match for all five participants. If a hacker accesses an image with an iris texture sufficient for iris recognition, the hacker would then be able to effectively steal the user's identity. Accordingly, existing eye tracking devices suffer from the inability to offer gaze tracking without providing access to the user's iris signatures. There is therefore a need in the art for eye tracking device that can degrade an iris texture (e.g., to decrease the accuracy of iris authentication), while still preserving robust pupil detection and gaze tracking.

BRIEF DESCRIPTION OF THE DRAWINGS

Reference will now be made to the accompanying drawings, which are not necessarily drawn to scale, and wherein.

DETAILED DESCRIPTION

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

Various embodiments described herein relate to degrading iris authentication in eye tracking devices while still permitting gaze tracking. In an example embodiment, degrading iris authentication includes optical defocus in the eye image. According to various embodiments, the eye tracking device operates by detecting the pupil and/or corneal reflection in a defocused eye image. In one embodiment, the optical defocus is provided by a defocus filter. In another embodiment, the optical defocus is provided by a mechanical defocus.

In certain examples, an eye tracking device includes a camera adapted to capture an eye image of at least one eye of a user. The eye tracking device further includes an image processor adapted to defocus the eye image in order to generate a defocused eye image. The defocused eye image comprises reduced iris authentication accuracy. The eye tracking device further includes a tracking processor configured to detect a pupil in the defocused eye image and determine a gaze direction of the user based at least in part on one or more of the defocused eye image and the pupil.

Brief Overview

According to various embodiments, an eye tracking device for pupil detection and gaze tracking is provided. Various embodiments of the eye tracking device are configured to defocus the iris to prevent iris authentication without compromising pupil detection and gaze tracking. This can be accomplished in certain embodiments by blurring images captured by the eye tracking device (e.g., image processing defocus) or by defocusing the camera itself (optical defocus).

Eye Tracking Device

Figure 2:
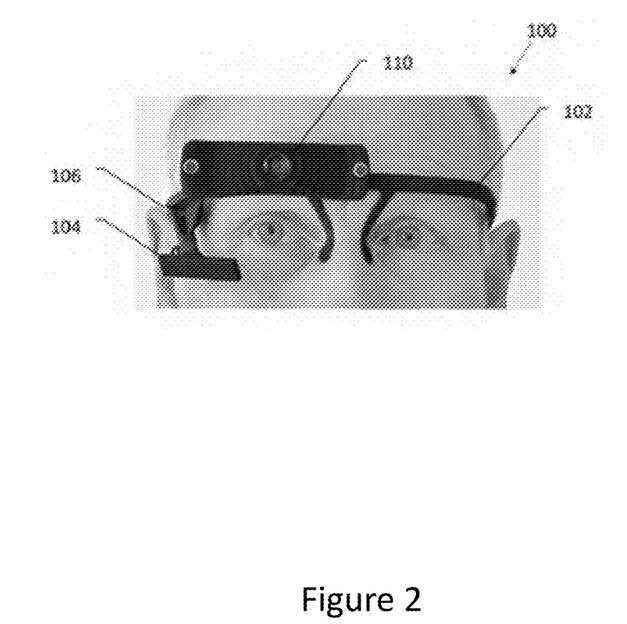
FIG. 2 illustrates an eye tracking device according to one embodiment.

FIG. 2 shows an eye tracking device 100 according to one embodiment. In the illustrated embodiment of FIG. 2, the eye tracking device is configured as a wearable headset and comprises a frame 102, an eye camera 104, and an eye camera mounting arm 106. In the illustrated embodiment of FIG. 2, the eye tracking device 100 is also depicted with an optional scene camera 110.

As shown in FIG. 2, the frame 102 is configured to fit a user's head analogously to a pair of eye glasses. The eye camera 104 is mounted on a distal end of the eye camera mounting arm 106 and angled toward one of the user's eyes. The opposite end of the eye camera mounting arm 106 is affixed to the frame 102. As discussed in greater detail herein, the eye camera mounting arm 106 is adjustable such that the position of the eye camera 104 relative to the user's eye can be adjusted.

According to various embodiments, the eye camera 104 may comprise a small, lightweight infrared (IR) camera configured for generating images of a sufficient frequency and resolution to track the movement of the user's pupil. In various other embodiments, the eye camera 104 may comprise any suitable camera capable of generating images of a sufficient frequency and resolution to track the movement of the user's pupil. In the illustrated embodiment of FIG. 2, the scene camera 110 is configured for aligning its optics with the user's eye (e.g., as detected by the eye camera 104). As will be appreciated from the description herein, various embodiments of the eye tracking device 100 may be provided without the scene camera 110. Furthermore, various additional features may be integrated into the eye tracking device 100 (e.g., in order to provide a user with mixed- or virtual-reality experience).

Figure 3:
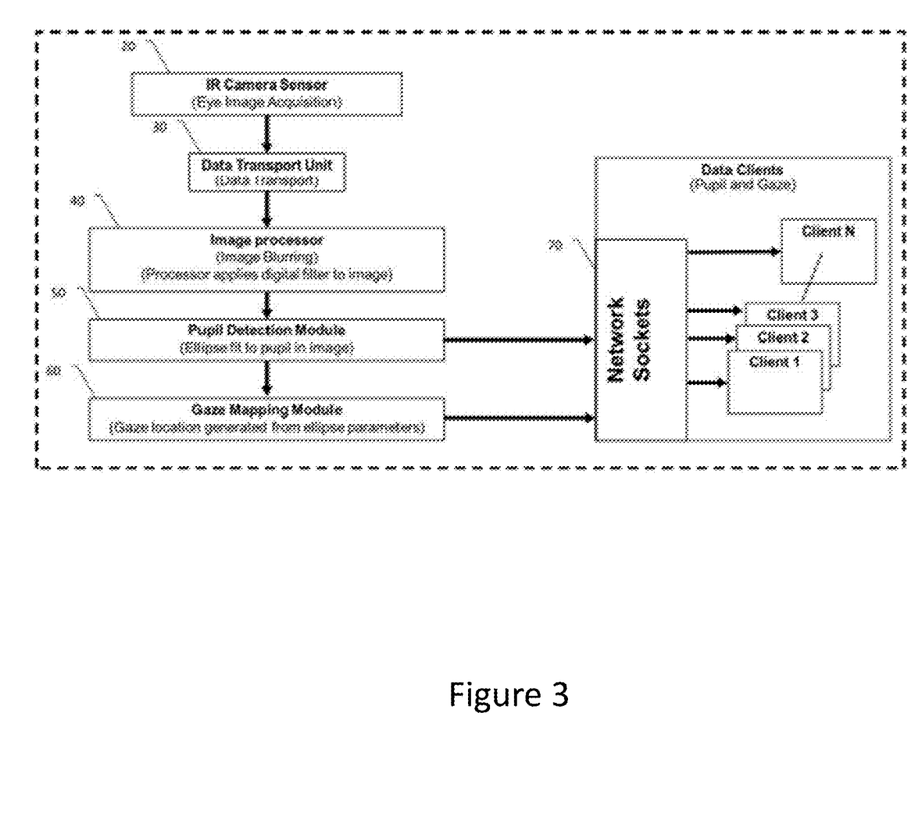
FIG. 3 provides a schematic diagram of image processing components of an eye tracking device according to one embodiment.

FIG. 3 shows a schematic diagram of various image processing components of the eye tracking device 100. As shown in FIG. 3, the eye camera 104 includes an IR camera sensor 20 configured for capturing images of the user's eye. Additionally, the eye tracking device 100 includes a data transport unit 30 configured for transmitting images captured by the IR camera sensor 20 to an image processor 40. In various embodiments, the image processor 40 is configured for processing images captured by the eye camera 104 in accordance the description below.

As shown in FIG. 3, the eye tracking device 100 also includes software modules 50, 60, which may be stored on and executed by a tracking processor. However, according to various other embodiments, the software modules 50, 60 may be stored on and/or executed by the image processor 40 or another computing device provided in the eye tracking device 100. According to various embodiments, the pupil detection module 50 is generally configured to fit a programmed ellipse to the pupil of the captured eye image. The gaze mapping module 60 is configured to determine the user's gaze location based on input from the pupil detection module 50 and ellipse parameters. The pupil detection module 50 and gaze mapping module 60 are further configured to output data via network sockets to one or more data clients 70 (e.g., software running on or connected to the eye tracking device 100 and utilizing data from the modules 50, 60).

Image Defocus Filter

In the illustrated embodiment of FIG. 3, the image processor 40 is configured to apply a defocus filter to degrade high frequency patterns of the iris necessary for authentication, while preserving low frequency features (e.g., glint or pupil edge) required for gaze estimation. For example, in one embodiment, the eye camera's IR camera sensor 20 captures an image of a user's eye. The image processor 40 receives this image (e.g., via the data transport unit 30) and applies a digital filter to the captured image in order to blur the image.

Figure 4A:
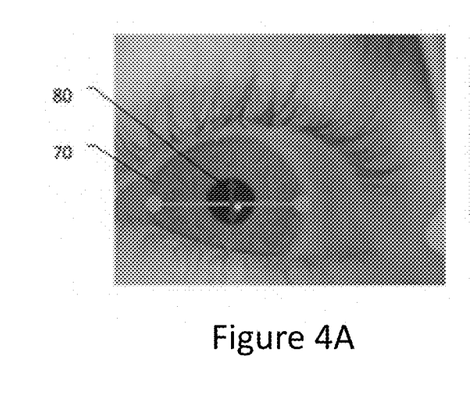
FIG. 4A illustrates an example eye image captured by the eye tracking device according to one embodiment.
Figure 4B:
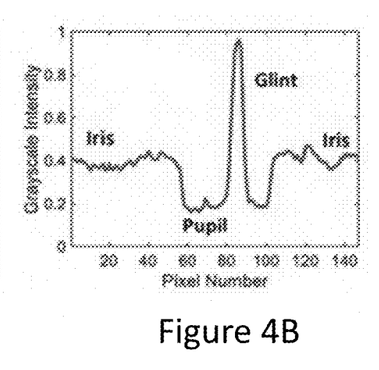
FIG. 4B depicts the corresponding grayscale intensity of the example eye image of FIG. 4A.

With respect to the defocus filter applied by the image processor 40, the image received from the IR camera sensor 20 may be defined as $I=I_C+I_R$. For simplicity, 1D functions may be assumed by regarding them as the variation in grayscale intensity along a line that spans the iris 70 and pupil 80 from one side to the other as shown in FIGS. 4A and 4B. $I_C$ may be regarded as the component of the image that contains eye tracking signal, for example, the corneal reflection or the pupil, which, for example, can be modeled as a Gaussian $I_C(\mu=0, \sigma_c)$. $I_R$ may be regarded as the iris. Although the iris texture has a broad variation, it can be assumed that the highest frequency in the signal may be limited by the size of each pixel of the eye camera. For example, the highest frequency may be defined as B. As such, while $I_C$ contains primarily low frequency content, $I_R$ contains both low and high frequency content, with the higher frequencies being the identifying features (up to the maximum frequency B).

In the illustrated embodiment, the digital filter is designed such that when convolved with the eye image, iris authentication is degraded, but eye tracking features are still detectable. For example, the digital filter may be designed as a low-pass filter F of the form $F(x)=N(\mu=0, \sigma)$ (e.g., a Gaussian blur, which simulates optical defocus). When I is convolved with F(x), the result is $I_D(x)=I(x)*F(x)=I_C(x)*F(x)+I_R*F(x)=I'_C(x)+I'_R(x)$, where $I'_C(x)$ still contains eye tracking features, while $I'_R$ no longer contains the higher frequencies that enable iris authentication.

Figure 5:
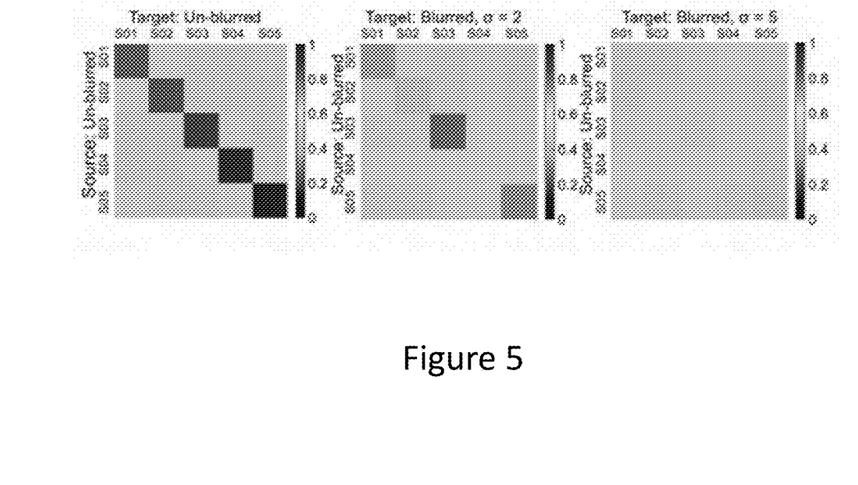
FIG. 5 depicts experimental results showing the iris matching rate of an example eye tracking device.
Figure 6:
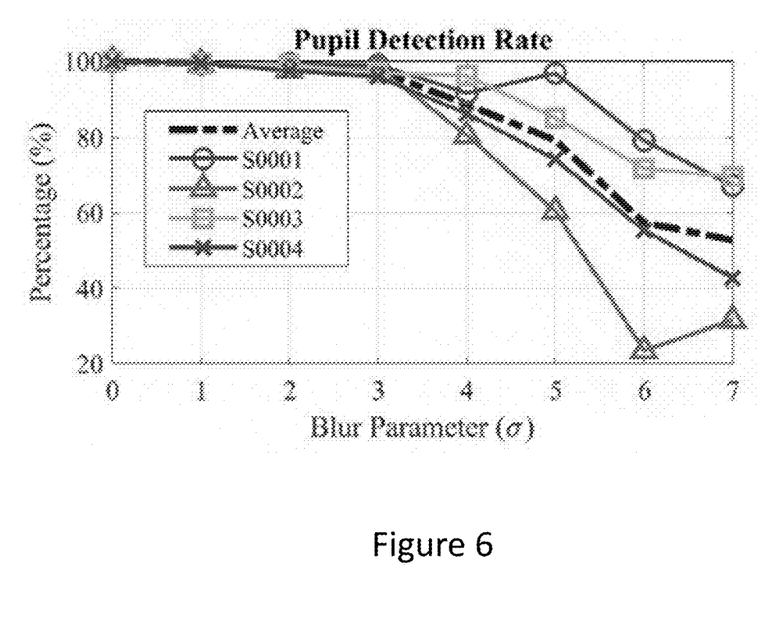
FIG. 6 depicts experimental results showing the pupil detection rate of an example eye tracking device.
Figure 7:
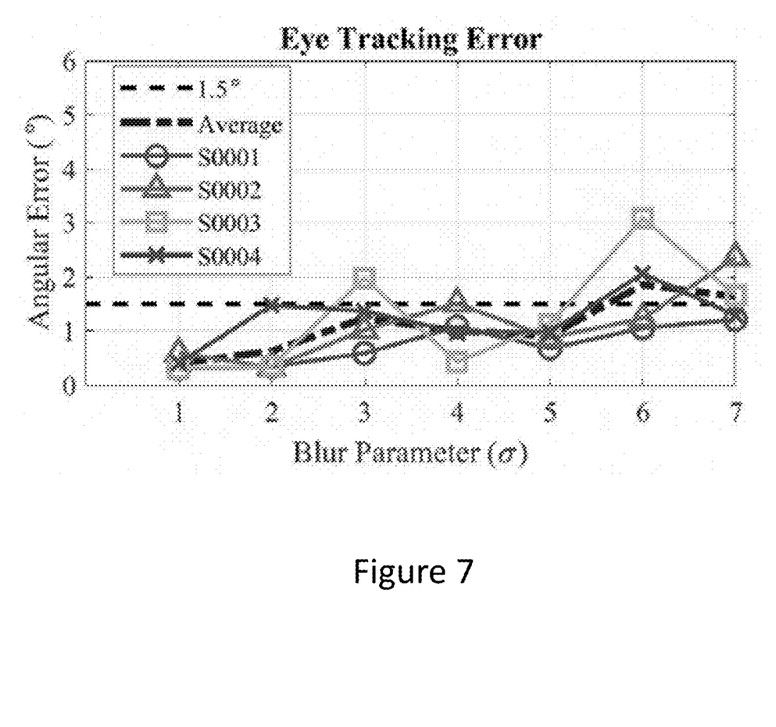
FIG. 7 illustrates experimental results showing the eye tracking error of an example eye tracking device.

FIGS. 5, 6, and 7 depict experimental results showing iris authentication accuracy, pupil detection rates and eye tracking errors, respectively, associated with varying blur parameters ($\sigma$). In the experimental process used to arrive at the data reflected in FIGS. 5, 6, and 7, five participants were fitted with an eye tracking headset (an existing Pupil Pro 2016, 30 Hz model). The eye tracking device used dark pupil tracking and a 320×240 resolution IR image of the eye, and a 5-point calibration was performed. The eye tracking device reported validation accuracy of less than 1.5°.

The eye image stream, scene camera video stream, and gaze data were recorded experimentally. Each frame of the original eye image stream was denoted as $f_i$, i=1, . . . , N. Each frame $f_i$ was defocused in simulation by convolving with a Gaussian Kernel of $\sigma$=0, 1, 2, 3, . . . , 10 pixels respectively. The blurred frame was denoted $f'_i$. Only those frames where the pupil was detected was computed for eye tracking accuracy, given that pupil detection is a prerequisite for gaze tracking. For those frames $f_j$, j=1, . . . , M where the pupil was detected, the 3D gaze vector reported by the eye tracking device was denoted $x_j$. These gaze points formed the ground truth data. The blurred frames were processed in accordance to the illustrated embodiment, and for those frames where the pupil was detected, the recomputed 3D gaze vector was denoted $x'_j$ (data from participant S0005 was removed from the analysis due to large inconsistencies in pupil detection and gaze accuracy).

FIG. 5 depicts experimental results showing iris matching rates. As shown in FIG. 5, the computed Hamming distance between the blurred and unblurred images showed 40% degraded authentication for blur parameter ($\sigma$)=2 pixels and no positive matches at $\sigma$=5 pixels.

FIG. 6 depicts experimental results showing pupil detection rates. As shown in FIG. 6, the pupil detection rate of the frames $f'_i$ (for different levels of $\sigma$ in pixels) was computed as the percentage of frames $f'_i$ where the pupil is detected, relative to the number of detected pupils in the frames $f_i$. Even with kernels as large as σ=5, approximately 80% of the frames have the pupil detected on average (default parameters for pupil detection were used in the experiment). FIG. 7 shows the average angular error between the gaze vector $x_j$ and $x'_j$. The angular error was computed as $\theta = \cos^{-1}(x_j \cdot x'_j)$, where both $x_j$ and $x'_j$ were normalized. As shown in FIG. 7, for blur up to σ=5 there was only one instance where gaze error exceeded 1.5°.

Accordingly, in embodiments, a defocus filter—applied to images captured by the image processor 40—with a blur parameter between about σ=3 and σ=5 is effective for both (i) degrading high frequency patterns of the iris to prevent iris authentication and (ii) preserve low frequency features (e.g., glint or pupil edge) required for gaze estimation. Furthermore, according to various embodiments, the image processor 40 may be configured for being toggled between an iris authentication "on" setting or "off" setting. For example, in various embodiments, the image processor 40 may be toggled between these settings via a button or switch provided on the eye tracking device's frame 102. In the "on" setting, the image processor 40 would be set to apply a defocus filter (e.g., with a blur parameter between about σ=3 and σ=5) in order to prevent iris authentication. In the "off" setting, the image processor 40 would be set not to apply the defocus filter, thereby enabling iris authentication as the user may desire.

It will be appreciated, however, that a range for a desired blur parameter may vary depending on a resolution of an eye camera, distance from an eye, field of view, aspect ratio, and more, and such variance is within the scope of the present disclosure. For example, the blur parameter range may linearly scale based on camera resolution such that the desired range is between 6 and 10.

Optical Defocusing of the Eye Camera

Figure 8A:
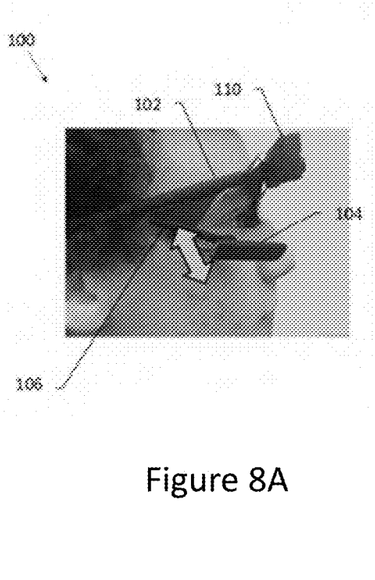
FIG. 8A shows an example eye tracking device configured in an in-focus position according to one embodiment.
Figure 8B:
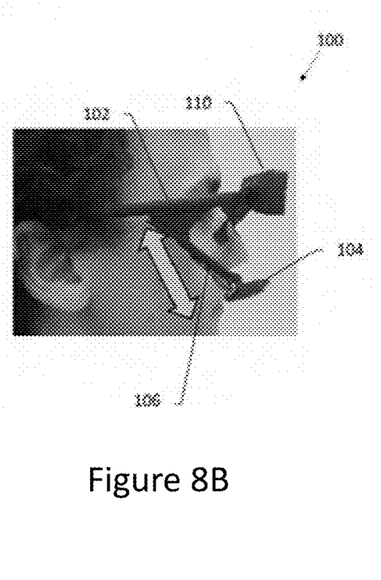
FIG. 8B shows an example eye tracking device configured in a defocused position according to one embodiment.

According to another embodiment, defocus sufficient to prevent iris authentication while preserving eye tracking can be achieved through optical defocus of the eye camera 104. For example, as shown in FIGS. 8A and 8B, the optical focus of the eye camera 104 can be changed by adjusting the position of the eye camera mounting arm 106. For example, FIG. 8A shows the eye camera 104 in a focused position, while FIG. 8B shows the eye camera 104 repositioned to achieve significant optical defocus.

To test the impact of the optical defocus, the inventors outfitted participants with an eye tracking device (in the experiment a Pupil Labs head-mounted eye tracker) and instructed participants to look at presented gaze targets. Five targets were presented: four at the corners of a screen and one in the center. Data was recorded in two configurations of the eye tracker's eye camera 104: first, when the eye tracker camera 104 was configured so that the eye image was perfectly in-focus (see FIG. 8A), and second, when the eye tracker camera 104 was configured so that the eye image was significantly defocused (see FIG. 8B). In the experiments, the eye tracker was calibrated to an accuracy of <1.5°.

Figure 10A:
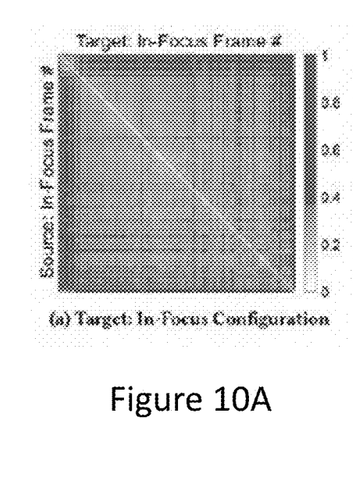
FIGS. 10A and 10B depict Hamming distances computed between iris patterns for in-focus and defocused eye images, respectively.
Figure 10B:
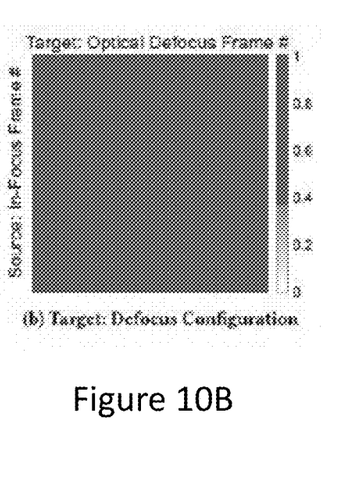

The experimental results first showed that optical defocusing of the eye camera 104 reduces iris authentication. In addition to viewing targets on the screen the participants were instructed to look directly at the IR camera for a duration of five seconds with goal of assessing whether the iris pattern captured in the defocus configuration could successfully authenticate the user. FIG. 10B visualizes the Hamming distance between the source and target frame for each frame in the defocus configuration. The average Hamming distance was 0.485 which was greater than the authentication threshold of 0.37. Every in-focus frame was also compared with every other in-focus frame to determine the effectiveness of iris authentication in the vulnerable configuration. As shown in FIG. 10A, 91% of in-focus frames produced a successful match, which would present a security vulnerability in the event the stream were hacked.

The experimental results also showed that optical defocus of the eye camera 104 could retain gaze estimation capability. In each configuration, the distance between the gaze location reported by the eye tracker and the presented target within the scene camera view was computed. The mean gaze error was calculated in pixels within the scene camera view, where the computer monitor spanned approximately 676 pixels horizontally and 456 pixels vertically. As the scene camera had a diagonal field of view of 90° and a resolution of 1280×720, the number of pixels along the diagonal was 1469. In other words, there was approximately 0.061 degrees per pixel. The mean error for the optical in-focus and optical defocus configurations of the eye camera 104 was 10 pixels (0.61°) and 19 pixels (1.16°) respectively. Both of these values are roughly the same magnitude as the calibration error for a typical eye tracker. Thus, the error from optical defocus solution was negligible with respect to on screen targets, as gaze error was less than 3% of the screen height and 5% of the width.

Figure 9:
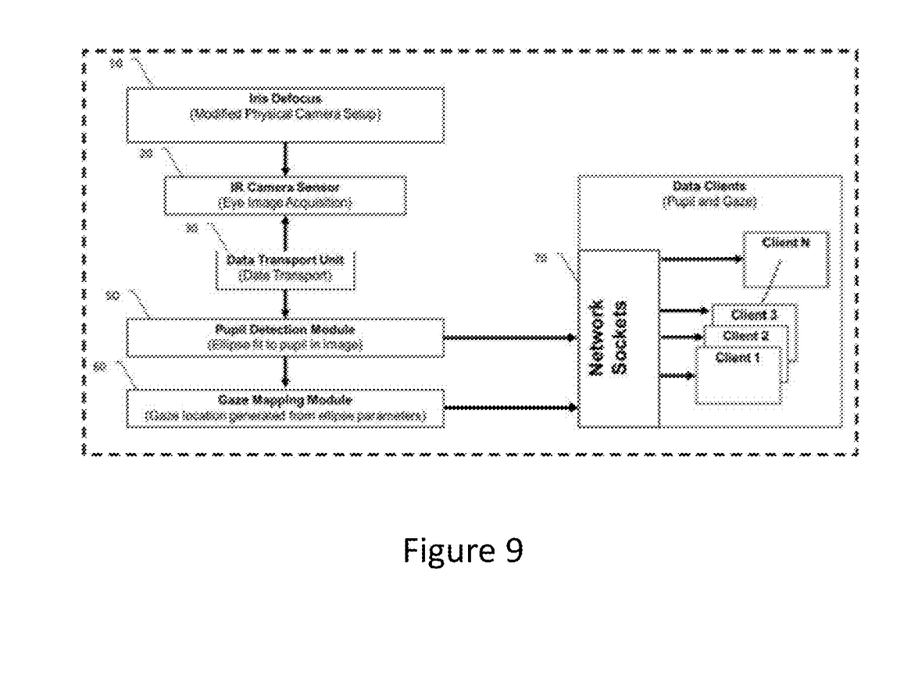
FIG. 9 shows a schematic diagram of an eye tracking device according to one embodiment.

By relying on optical defocus to sufficiently blur captured images, the eye tracking device 100 can be provided without a filter-applying image processors. For example, FIG. 8 shows a schematic diagram of various image processing components of the eye tracking device 100 according to an alternative embodiment. In the illustrated embodiment of FIG. 8, the eye camera's IR sensor 20 is configured to output a defocused eye image (to degrade iris authentication) directly to the software modules 50, 60 (e.g., via the data transport unit 30). In this way, a defocus filter applied by an image processor is not needed. Moreover, in the embodiments depicted in FIGS. 8A, 8B, and 9, the user can manually toggle the eye tracking device between an iris authentication "on" setting (the position shown in FIG. 10A) and an iris authentication "off" setting (the position shown in FIG. 10B).

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An eye tracking device configured for tracking a pupil of an eye of a user, the eye tracking device comprising:
   a camera adapted to capture an eye image of at least one eye of a user;
   an image processor adapted to defocus the eye image in order to generate a defocused eye image, wherein the defocused eye image comprises reduced iris authentication accuracy; and
   a tracking processor configured for executing instructions, the instructions configured to cause the eye tracking device to:
   detect a pupil in the defocused eye image; and determine a gaze direction of the user based at least in part on one or more of the defocused eye image and the pupil.

2. The eye tracking device of claim 1, wherein the camera comprises an infrared camera sensor.

3. The eye tracking device of claim 1, wherein the image processor is configured to defocus the eye image by convolving with a low-pass filter.

4. The eye tracking device of claim 3, wherein the low-pass filter comprises a Gaussian kernel.

5. The eye tracking device of claim 4, wherein the Gaussian kernel comprises a blur parameter between 3 pixels and 5 pixels.

6. The eye tracking device of claim 1, further comprising a frame, wherein the camera, the image processor, and the tracking processor are operatively connected to the frame.

7. The eye tracking device of claim 6, where the frame is adapted for placement on a head of the user such that the eye tracking device functions as a headset.

8. The eye tracking device of claim 1, wherein detecting the pupil comprises fitting a programmed ellipse to the pupil in the defocused eye image.

9. The eye tracking device of claim 8, wherein determining the gaze direction is further based in part on ellipse parameters of the programmed ellipse.

10. A method of tracking a pupil of an eye of a user, the method comprising:
   capturing, using a camera, an eye image of at least one eye of a user;
   defocusing, using an image processor, the eye image in order to generate a defocused eye image, wherein the defocused eye image comprises reduced iris authentication accuracy;
   detecting, using a tracking processor, a pupil in the defocused eye image; and
   determining, using a tracking processor, a gaze direction of the user based on the defocused eye image.

11. The method of claim 10, wherein defocusing the eye image comprises convolving with a low-pass filter.

12. The method of claim 11, wherein the low-pass filter comprises a Gaussian kernel.

13. The method of claim 12, wherein the Gaussian kernel comprises a blur parameter between 3 pixels and 5 pixels.

14. An eye tracking device configured for tracking a pupil of an eye, the eye tracking device comprising:
   a movable camera adapted to capture an eye image of at least one eye of a user, the movable camera being adjustable between an in-focus position and a defocused position; and
   a tracking processor configured for executing instructions stored in a local memory of the eye tracking device, the instructions configuring the tracking processor to:
      detect the pupil in the eye image; and
      determine a gaze direction of the user based on the eye image;
   wherein, when the movable camera is in the in-focus position, authentication of an iris in the eye image is enabled; and
   wherein, when the movable camera is in the defocused position, authentication of the iris in the eye image is disabled.

15. The eye tracking device of claim 14, wherein the movable camera comprises an infrared camera sensor.

16. The eye tracking device of claim 14, wherein the movable camera is further away from the at least one eye of the user in the defocused position than in the in-focus position.

17. The eye tracking device of claim 14, further comprising a frame, wherein the movable camera and the tracking processor are operatively connected to the frame.

18. The eye tracking device of claim 17, further comprising a camera mounting arm having a distal end and a proximate end, wherein the camera mounting arm is connected to the movable camera at the distal end and connected to the frame at the proximate end.

19. The eye tracking device of claim 17, where the frame is adapted for placement on a head of the user such that the eye tracking device functions as a headset.

20. The eye tracking device of claim 14, wherein the movable camera is adjustable between the in-focus position and the defocused position by adjusting the camera mounting arm.

* * * * *